US010700373B2

(12) United States Patent
Capuano et al.

(10) Patent No.: US 10,700,373 B2
(45) Date of Patent: Jun. 30, 2020

(54) MEMBRANE ELECTRODE ASSEMBLY AND METHOD OF MAKING THE SAME

(71) Applicant: PROTON ENERGY SYSTEMS, INC., Wallingford, CT (US)

(72) Inventors: Christopher Bryce Capuano, Middletown, CT (US); Morgan Elizabeth Pertoso, Middletown, CT (US); Nemanja Danilovic, New Haven, CT (US)

(73) Assignee: PROTON ENERGY SYSTEMS, INC., Wallingford, CT (US)

( * ) Notice: Subject to any disclaimer, the term of this patent is extended or adjusted under 35 U.S.C. 154(b) by 65 days.

(21) Appl. No.: 15/682,803

(22) Filed: Aug. 22, 2017

(65) Prior Publication Data

US 2018/0062192 A1 Mar. 1, 2018

Related U.S. Application Data (60) Provisional application No. 62/379,311, filed on Aug. 25, 2016.

(51) Int. Cl.
| | | |
|---|---|---|
| *H01M 8/1004* | (2016.01) | |
| *H01M 8/1023* | (2016.01) | |
| *H01M 8/1025* | (2016.01) | |
| *H01M 8/1027* | (2016.01) | |
| *H01M 8/1041* | (2016.01) | |
| *H01M 4/88* | (2006.01) | |
| *C01G 55/00* | (2006.01) | |
| *C08G 65/22* | (2006.01) | |
| *C08G 65/40* | (2006.01) | |
| *C08F 14/18* | (2006.01) | |
| *C08F 12/16* | (2006.01) | |
| *H01M 8/1018* | (2016.01) | |

(52) U.S. Cl.
CPC ........ *H01M 8/1004* (2013.01); *C01G 55/001* (2013.01); *C08G 65/4025* (2013.01); *H01M 4/881* (2013.01); *H01M 4/8817* (2013.01); *H01M 8/1023* (2013.01); *H01M 8/1025* (2013.01); *H01M 8/1027* (2013.01); *H01M 8/1055* (2013.01); *C01G 55/004* (2013.01); *C08F 12/16* (2013.01); *C08F 14/18* (2013.01); *C08G 65/226* (2013.01); *H01M 2008/1095* (2013.01); *Y02P 70/56* (2015.11)

(58) Field of Classification Search
CPC .. H01M 4/881; H01M 4/8817; H01M 8/1023; H01M 8/1025; H01M 8/1027; H01M 8/1053; H01M 8/1055; H01M 8/1069; H01M 2008/1095; H01M 8/1004; C01G 55/001; C01G 55/004; C08G 65/226; C08G 65/4025; C08F 14/18
See application file for complete search history.

(56) References Cited

U.S. PATENT DOCUMENTS

| | | |
|---|---|---|
| 6,403,245 B1 | 6/2002 | Hunt |
| 7,112,386 B2 | 9/2006 | Cipollini et al. |
| 8,257,979 B2 | 9/2012 | Balogh et al. |
| 8,338,328 B2 | 12/2012 | Makita |
| 9,178,238 B2 | 11/2015 | Fuller et al. |
| 9,181,625 B2 | 11/2015 | Masel et al. |
| 9,391,336 B2 | 7/2016 | Madden et al. |
| 9,391,337 B2 | 7/2016 | Wang et al. |
| 2002/0058172 A1 | 5/2002 | Datz et al. |
| 2002/0102451 A1* | 8/2002 | Acker ................. H01M 8/1009 429/481 |
| 2003/0158273 A1* | 8/2003 | Kosako ............... H01M 4/8605 521/27 |
| 2004/0175498 A1* | 9/2004 | Hedhli ..................... C23C 16/18 427/248.1 |
| 2005/0014037 A1 | 1/2005 | Boyer et al. |
| 2005/0163920 A1 | 7/2005 | Yan et al. |
| 2005/0164072 A1 | 7/2005 | Yan et al. |
| 2005/0271929 A1 | 12/2005 | Sompalli et al. |
| 2007/0037030 A1 | 2/2007 | Ogami et al. |
| 2007/0141405 A1 | 6/2007 | Lai et al. |
| 2008/0107945 A1 | 5/2008 | Coms et al. |
| 2009/0081527 A1 | 3/2009 | He et al. |
| 2009/0087698 A1 | 4/2009 | Huth et al. |
| 2009/0176141 A1* | 7/2009 | Santurri .............. H01M 8/1023 429/494 |
| 2010/0047631 A1 | 2/2010 | Madden et al. |
| 2010/0291462 A1 | 11/2010 | Thate et al. |
| 2011/0076592 A1 | 3/2011 | Yamauchi et al. |
| 2011/0097642 A1 | 4/2011 | Miyake et al. |
| 2011/0195283 A1 | 8/2011 | Sun et al. |
| 2011/0244340 A1 | 10/2011 | Cipollini et al. |
| 2012/0094215 A1 | 4/2012 | Satou et al. |
| 2013/0089805 A1 | 4/2013 | Brooker et al. |
| 2013/0157167 A1 | 6/2013 | Peters et al. |
| 2013/0157169 A1 | 6/2013 | Madden et al. |
| 2013/0330651 A1 | 12/2013 | Thompsett et al. |
| 2015/0249253 A1 | 9/2015 | Lee et al. |
| 2015/0298998 A1 | 10/2015 | Legzdins |
| 2015/0322578 A1 | 11/2015 | Wakabayashi et al. |
| 2015/0364769 A1 | 12/2015 | Cerri et al. |

(Continued)

FOREIGN PATENT DOCUMENTS

| | | |
|---|---|---|
| FR | 2624885 A1 | 6/1989 |
| JP | H0622144 B2 | 10/1987 |

(Continued)

OTHER PUBLICATIONS

Corrosionpedia-Curing, https://www.corrosionpedia.com/definition/354/curing, date unknown.*

(Continued)

*Primary Examiner* — Anca Eoff
(74) *Attorney, Agent, or Firm* — Canton Colburn LLP (57) ABSTRACT

Disclosed herein is a method of manufacturing a membrane electrode assembly (MEA) including directly depositing a liquid suspension containing a platinum precursor onto an ionically conductive membrane (e.g., proton-exchange membrane) that, when the platinum precursor deposit layer is reduced, provides a layer that will scavenge hydrogen that has diffused back through the membrane due to cell stack pressure differential.

15 Claims, 3 Drawing Sheets

(56) References Cited

U.S. PATENT DOCUMENTS

| | | |
|---|---|---|
| 2015/0380757 A1 | 12/2015 | Li et al. |
| 2016/0006041 A1 | 1/2016 | O'Malley et al. |
| 2016/0064741 A1 | 3/2016 | Kumaraguru et al. |
| 2016/0072134 A1 | 3/2016 | Ohma et al. |
| 2016/0181640 A1 | 6/2016 | Kaku et al. |

FOREIGN PATENT DOCUMENTS

| | | |
|---|---|---|
| JP | 2004127901 A | 4/2004 |
| JP | 2004199943 A | 7/2004 |
| JP | 2005285356 A | 10/2005 |
| WO | 2007119349 A1 | 10/2007 |
| WO | 2012033204 A1 | 3/2014 |

OTHER PUBLICATIONS

French Patent No. 2624885(A1); Date of Publication: Jun. 23, 1989; Machine Translation; 13 Pages.

Japanese Patent No. H0622144(B2); Date of Publication: Oct. 27, 1987; Machine Translation; 4 Pages.

International Search Report of the International Searching Authority for International Application No. PCT/US2017/47082; dated Oct. 31, 2017; Date of Completion: Oct. 5, 2017; 11 Pages.

Written Opinion of the Intemationl Searching Authority for International Application No. PCT/US2017/47082; International Filing Date: Aug. 16, 2017; dated Oct. 31, 2017; 5 Pages.

\* cited by examiner

MEMBRANE ELECTRODE ASSEMBLY AND METHOD OF MAKING THE SAME

CROSS REFERENCE TO RELATED APPLICATIONS

This application claims the benefit of U.S. Application Ser. No. 62/379,311, filed Aug. 25, 2016 which is incorporated herein by reference in its entirety.

FEDERAL RESEARCH STATEMENT

Portions of this invention were made with Government support under contract no. DE-SC0009213, awarded by the United States Department of Energy. The Government has certain rights in the invention.

BACKGROUND

Fuel cells are envisaged as an electric power supply system for future mass-produced motor vehicles as well as for a large number of applications. A fuel cell is an electrochemical device that converts chemical energy directly into electrical energy. Hydrogen ($H_2$) or molecular hydrogen is used as a fuel for the fuel cell. The molecular hydrogen is oxidized on an electrode of the cell and oxygen ($O_2$) or molecular oxygen from the air is reduced on another electrode of the cell. The chemical reaction produces water. The great advantage of the fuel cell is that it averts emissions of atmospheric pollutant compounds at the place where electricity is generated.

One of the major difficulties in the development of such fuel cells lies in the synthesis and supply of dihydrogen (or molecular hydrogen). On earth, hydrogen does not exist in great quantities except in combination with oxygen (in the form of water), sulphur (in the form of hydrogen sulphide) and nitrogen (as ammonia) or carbon (fossil fuels such as natural gas or petroleum). The production of molecular hydrogen therefore requires either the consumption of fossil fuels or the availability of large quantities of low-cost energy in order to obtain this hydrogen from the decomposition of water, by thermal or electrochemical means.

One method for producing hydrogen from water consists of the use of the principle of electrolysis. To implement such methods, electrolyzers provided with proton-exchange membranes (PEMs) are known. In such an electrolyzer, an anode and a cathode are fixed on either side on the proton-exchange membrane and put into contact with water. A difference in potential is applied between the anode and the cathode. Thus, oxygen is produced at the anode by oxidation of water. The oxidation at the anode also gives rise to H+ ions that pass through the proton-exchange membrane up to the cathode, and electrons that are sent back to the cathode by the electrical supply unit. At the cathode, the H+ ions are reduced at the level of the cathode to generate molecular hydrogen.

Such an electrolysis device comes up against undesirable effects. The proton-exchange membrane is not perfectly impermeable to gas. A part of the gases produced at the anode and the cathode thus passes through the proton-exchange membrane by diffusion. This induces problems of purity of the gas produced but also induces problems of security. It is desired that the proportion of hydrogen in oxygen remain below 4%.

The permeability of the membranes to gas can be reduced by increasing the thickness of the proton-exchange membrane. This, however, causes an increase in the electrical resistance by making it more difficult for the H+ ions to pass through, and lowers the performance of the systems.

To limit the permeability of a proton-exchange membrane to gases, certain developments suggest a depositing of catalyst particles inside the proton-exchange membrane. The catalyst particles seek to recombine the molecular hydrogen passing through the membrane with molecular oxygen passing through the membrane. The quantities of molecular oxygen that reach the cathode and of molecular hydrogen that reach the anode are thus reduced.

However, the recombination reaction of the catalyst particles is exothermal and induces a loss of energy. Furthermore, such a solution is not optimized for industrial-scale applications since a part of the molecular hydrogen generated at the cathode is nevertheless lost inside the proton-exchange membrane. Furthermore, the permeability of the proton-exchange membrane to molecular hydrogen is greater than its permeability to molecular oxygen. Consequently, a part of the molecular hydrogen nevertheless reaches the anode since the quantity of molecular oxygen is insufficient in the catalyst particles disposed in the membrane.

In order to achieve low cost, efficient, and durable fuel cells, the fabrication process of the known MEAs needs to be improved.

BRIEF DESCRIPTION

The above described and other features are exemplified by the following figures and detailed description.

In an embodiment, a membrane electrode assembly includes an ionically conductive membrane positioned between a first electrode and a second electrode, wherein the ionically conductive membrane is in direct contact with the second electrode; a cured recombination layer deposited on a surface of the ionically conductive membrane, wherein the ionically conductive membrane is positioned between the second electrode and the recombination layer; and an ionomer layer deposited on a surface of the cured recombination layer, wherein the ionomer layer is positioned between the cured recombination layer and the first electrode.

In an embodiment, a method for manufacturing a membrane electrode assembly, the method including depositing a recombination suspension directly onto a surface of an ionically conductive membrane forming a recombination layer, wherein the recombination suspension includes a solvent and metal oxide; reducing the recombination layer to provide a cured recombination layer; and depositing an ionomer layer on a surface of the cured recombination layer.

BRIEF DESCRIPTION OF THE DRAWINGS

Refer now to the figures, which are exemplary embodiments, and wherein the like elements are numbered alike.

DETAILED DESCRIPTION

Disclosed herein is a method of manufacturing a membrane electrode assembly (MEA) including depositing a liquid suspension containing a platinum precursor directly onto an ionically conductive membrane (e.g., proton-exchange membrane) that, when the platinum precursor deposit layer is reduced, provides a layer that will scavenge hydrogen that has diffused back through the membrane due to cell stack pressure differential. Specifically, prior to the deposition of the catalyst layers, a recombination layer is applied to the anode side of a proton membrane and capped with an ionomer layer to prevent electrical interaction with the oxygen evolution reaction (OER) catalyst. Without the ionomer layer positioned between the anode catalyst and the recombination layer, the recombination layer may be completely ineffective or have reduced effectivity in managing the hydrogen crossover. The result is a unified catalyst coated membrane (CCM) that has durability and performance matching conventional manufacturing process.

The present CCM allows for high differential pressure operation by keeping the hydrogen and oxygen content below the desired threshold. In addition, the process can be applied to the deposition of both cathode and anode catalyst ink suspensions. The anode ink can be applied directly onto the previously deposited ionomer layer adjacent to the recombination layer. The cathode formula ink can be applied directly to the membrane in the counter position.

An ionic liquid suspension, typically a platinum precursor suspension, can be used to form the recombination layer that is applied directly as a dry layer onto the surface of a dry ionically conductive membrane, eliminating distortion resulting from liquid contact. The process also controls the loading of platinum on the surface required to work as an effective recombination layer, minimizes electrical resistance, and provides a uniform ionomer covering layer as the required barrier between the recombination layer and the catalyst electrode. The ionomer layer is applied in a similar process as that of the recombination layer to cap the recombination layer, i.e., a dry application directly onto the recombination layer. The recombination layer applied is reduced, which converts the platinum in solution to a metal. In an example, the recombination layer can be reduced in either an aqueous solution comprised of $NaBH_4$. In an example, the recombination layer can be reduced in a chamber where a reducing atmosphere has been introduced in the form of either pure hydrogen gas or a forming gas.

After reduction of the recombination layer, anode and cathode catalyst layers are applied using the same or similar device and settings as that of the recombination layer to create the discrete catalyst layers. The result of which produces a membrane electrode assembly as a single usable part comprised of an ionically conductive membrane, recombination layer including an ionomer layer cap, and both cathode and anode electrodes. The MEA prepared using the disclosed method enables a catalyst loading on the anode of 0.6-1.2 $mg/cm^2$ oxygen evolution reaction (OER) catalysts and cathode ladings of 0.3 $mg/cm^2$ hydrogen evolution reaction (HER) catalysts.

Figure 1:
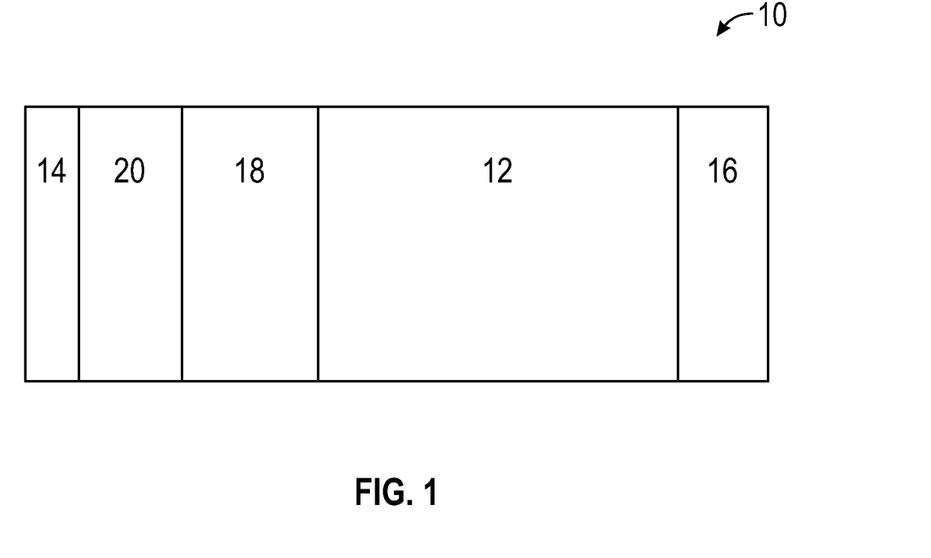
FIG. 1 is an embodiment of a membrane electrode assembly.

As depicted in FIG. 1, the membrane electrode assembly (MEA) 10 includes ionically conductive membrane 12 having an anode 14 and a cathode 16 disposed on opposite sides thereof. Between the ionically conductive membrane 12 and the anode 14 is a recombination layer 18 deposited directly on the anode side of the ionically conductive membrane 12. In addition, an ionomer layer 20 is deposited directly onto the recombination layer 18, wherein the ionomer layer 20 is positioned between the recombination layer 18 and the anode 14.

The ionically conductive membrane 12 comprises electrolytes that are preferably solids or gels under the operating conditions of the electrochemical cell. Useful materials include proton conducting ionomers and ion exchange resins. Useful proton conducting ionomers include complexes comprising an alkali metal salt, an alkali earth metal salt, a protonic acid, or a protonic acid salt. Useful complex-forming reagents include alkali metal salts, alkaline metal earth salts, and protonic acids and protonic acid salts. Counter-ions useful in the above salts include halogen ion, perchloric ion, thiocyanate ion, trifluoromethane sulfonic ion, borofluoric ion, and the like. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, and the like. The alkali metal salt, alkali earth metal salt, protonic acid, or protonic acid salt is complexed with one or more polar polymers such as a polyether, polyester, or polyimide, or with a network or cross-linked polymer containing the above polar polymer as a segment. Useful polyethers include polyoxyalkylenes, such as polyethylene glycol, polyethylene glycol monoether, and polyethylene glycol diether; copolymers of at least one of these polyethers, such as poly(oxyethylene-co-oxypropylene) glycol, poly(oxyethylene-co-oxypropylene) glycol monoether, and poly(oxyethylene-co-oxypropylene) glycol diether; condensation products of ethylenediamine with the above polyoxyalkylenes; and esters, such as phosphoric acid esters, aliphatic carboxylic acid esters or aromatic carboxylic acid esters of the above polyoxyalkylenes. Additionally, copolymers of, e.g., polyethylene glycol with dialkylsiloxanes, maleic anhydride, or polyethylene glycol monoethyl ether with methacrylic acid, exhibit sufficient ionic conductivity to be useful. The membrane 202 can also comprises a combination comprising at least one of the above materials.

Ion-exchange resins useful as proton conducting materials include hydrocarbon- and fluorocarbon-type resins. Hydrocarbon-type ion-exchange resins include phenolic resins, condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-type ion-exchange resins may include hydrates of tetrafluoroethylene-perfluorosulfonyl ethoxyvinyl ether or tetrafluoroethylene-hydroxylated (perfluoro vinyl ether) copolymers. When oxidation and/or acid resistance is desirable, for instance, at the cathode of a fuel cell, fluorocarbon-type resins having sulfonic, carboxylic and/or phosphoric acid functionality are preferred. Fluorocarbon-type resins may exhibit excellent resistance to oxidation by halogen, strong acids and bases. One family of fluorocarbon-type resins having sulfonic acid group functionality is NAFION® resins (commercially available from E.I. du Pont de Nemours and Company, Wilmington, Del.)

The recombination layer 18 can include a recombination catalyst precursor solution. The recombination catalyst precursor solution can include a recombination catalyst. Suitable hydrogen/oxygen recombination catalysts which can be used are preferably platinum, ruthenium, iridium, palladium, rhodium, mixtures of these metals with each other; as well as, alloys between any or more of the above, platinum metals with transition metals (e.g., cobalt, nickel, etc.). Other suitable hydrogen/oxygen recombination catalysts are Ag, Au, Sn, Si, Ti, Zr, Al, Hf, Ta, Nb, Ce and combinations thereof including oxides thereof where applicable. The recombination layer can be deposited onto ionically conductive membrane as thin layers of less than or equal to 10 microns, preferably less than or equal to 100 nm, most preferably less than or equal to 20 nm, as thin layers reduce the cost of the possible noble metal constituents. In one embodiment of the invention, the recombination catalyst are non-porous in order to reduce gas diffusion within the recombination layer it is most preferable to use unsupported hydrogen/oxygen recombination catalysts which afford the desired lower gas porosity and are generally thought to produce less radicals which would damage the ionically conductive membrane.

An ionomer layer is provided between the recombination layer and the anode to prevent electrical interaction between the recombination layer and the anode catalyst. The ionomer layer can include a solid proton transmissive electrolyte membrane. The ionomer layer can include perfluorosulfonic acid (PFSA), perfluorocyclobutane (PFCB), polyvinylidene fluoride (PVDF), polyether ether ketone (PEEK), polystyrene sulfonic acid (PSSA), poly(trifluorostyrene) sulfonic acid, polyvinylphosphoric acid (PVPA), polyacrylic acid (PAA), polyvinyl sulfonic acid (PVSA), sulfonated polyphenylene oxide (PPO), polybenzimidazle (PBI), brominated polyfluorene ether sulfone (BrPFES), polysulfone trimethylamine (PSF/TMA), and combinations thereof. In an example, the ionomer layer can include perfluorosulfonic acid (PFSA), perfluorocyclobutane (PFCB), polyvinylidene fluoride (PVDF), and combinations thereof. For example, the ionomer layer can include perfluorosulfonic acid (PFSA) membrane, a commercial example of which is NAFION™.

The recombination layer 18 and the ionomer layer 20 are on the anode side of the ionically conductive membrane 12. However, the scope of the invention includes embodiments wherein instead the recombination layer 18 and the ionomer layer 20 are on the cathode side of the ionically conductive membrane 12.

The anode and cathode can comprise catalyst suitable for performing an electrochemical reaction (i.e., electrolyzing water to produce hydrogen and oxygen). Suitable electrodes comprise, but are not limited to, platinum, palladium, rhodium, carbon, gold, tantalum, tungsten, ruthenium, iridium, osmium, as well as alloys and combinations comprising at least one of the foregoing, and the like. The anode 14 and cathode 16 can be formed on the ionically conductive membrane 12, or may be layered adjacent to, but in ionic communication with, the ionically conductive membrane 12. In an example, the cathode 16 can be in direct contact with the ionically conductive membrane 12, wherein the anode 14 is not in direct contact with the ionically conductive membrane 12 but is in ionic communication with the ionically conductive membrane 12 via the ionomer layer 20 and recombination layer 18.

A catalyst ink solution (e.g., a catalyst component, a suspension medium, and optionally a binder) can be used to form the anode 14 and the cathode 16. The catalyst consumption and utilization in an electrode may be improved by forming an ink having the catalyst dispersed in a solvent base. The solvent is preferably of a nature similar to that of the ionically conductive membrane 12. The anode catalyst ink solution can be deposited on the ionomer layer 20 to form the anode 14, and the cathode catalyst ink solution can be deposited on the surface of the ionically conductive membrane 12 opposite that of the recombination layer 18.

Suitable materials for catalyst component include, but is not limited to, platinum, palladium, rhodium, carbon, gold, tantalum, tungsten, ruthenium, iridium, osmium, alloys comprising at least one of the foregoing, and the like. Platinum, e.g., platinum black, is preferred for the hydrogen side electrode. The catalyst component may be incorporated in the catalyst ink precursor solution in a form of a powder. For example, the catalyst component may have a particle size of about 10 nanometers to about 100 nanometers (nm), with about 15 nm to about 50 nm preferred.

Unlike current electrode designs, the electrodes disclosed herein have a much lower loading. For example, current electrodes designs may have a catalyst metal (e.g., platinum) loading of about 2 milligrams per square centimeter (mg/$cm^2$) to about 7 $mg/cm^{2+}$ whereas electrodes disclosed herein have a platinum loading of less than or equal to about 1.5 $mg/cm^2$, with a loading of about 0.5 $mg/cm^2$ to about 0.8 $mg/cm^2$ preferred. While attaining substantially the same activity, this is a significant improvement over existing electrode loadings, which allows for a reduction in the catalyst material used. As such, electrodes can be made in a shorter amount of time and at a reduced cost.

Conventionally, catalyst layers deposited on a polymer electrolyte membrane are first deposited indirectly to the membrane by coating the catalyst on a decal substrate that is then transferred to the membrane by hot-pressing. However, such conventional processes have exhibited failure along the catalyst edge. For example, the membrane has been shown to tear adjacent to the outer edge of the catalyst layer on both the anode and cathode sides of the MEA. This failure typically corresponds to the edge of the decal substrate during the hot-pressing and translates to a possible weakening of the membrane along the catalyst edge.

The present method does not require a decal for depositing the recombination layer, the ionomer layer, nor the catalyst layers. As a result, expense and time are saved in the manufacturing process. In addition, a high quality MEA is produced without the disadvantages associated with using processes that utilize decals and solution based applications.

The recombination layer, the ionomer layer, and the catalyst layers are applied by directly spraying the layer material directly onto the appropriate surface for application. For example, the recombination layer can be deposited by spraying the recombination precursor solution onto the surface of the ionically conductive membrane, wherein the solvent is substantially evaporated from the recombination precursor solution before the recombination precursor solution contacts the ionically conductive membrane surface. As a result, a substantially dry recombination layer is directly applied to the ionically conductive membrane, thereby avoiding the disadvantages of a solution based approach. The ionomer layer and catalyst layers are applied in a similar manner.

Embodiments of the specific process parameters for applying the recombination layer, ionomer layer, and catalyst ink are listed in Table 1 and include ink density, system temperature, spray coater height, deposition flow rates, spray coater travel speed, dwell time, and number of passes based on required loadings.

TABLE 1

| Parameter | Recombination Layer | Ionomer Layer | Anode Catalyst Ink | Cathode Catalyst Ink |
| --- | --- | --- | --- | --- |
| Density (mg/mL) | 6 | 2.5-5 | — | — |
| % Solids | — | — | 4-11 | 4-8 |
| Temperature (° C.) | 80 | 80 | 80 | 80 |
| Spray Coater Height (mm) | 120 | 120 | 120 | 120 |
| Deposition Flow Rate (mL/min) | 1.5 | 1.5 | 1.5 | 1.5 |
| Spray Coater Travel Speed (mm/s) | 120 | 120 | 120 | 120 |
| Dwell Time (s) | 10-30 | 10-30 | 10-30 | 10-30 |
| Number of Passes | 20 | 10-20 | 20-40 | 10-20 |

EXAMPLES

The membrane electrode assemblies used in the examples were prepared by a Ultrasonic Systems, Inc. Prism Benchtop model.

Example 1

In Example 1, a membrane electrode assembly was manufactured including a recombination layer deposited onto a NAFION™ membrane, an ionomer layer deposited on the recombination layer, an anode catalyst layer applied to the ionomer layer, and a cathode catalyst layer applied to the surface of the NAFION™ membrane opposite that of the recombination layer.

The recombination suspension used included a platinum diamine dinitrate solution containing 6 mg Pt/ml. The ionomer layer included a 5 weight percent solids NAFION dispersion diluted to 2.5 wt % using isopropyl alcohol.

The membrane electrode assembly was manufactured according to the process parameters listed in Table 2.

TABLE 2

| Parameter | Recombination Layer | Ionomer Layer | Anode Catalyst Ink | Cathode Catalyst Ink |
| --- | --- | --- | --- | --- |
| Density (mg/mL) | 6 | 5 | — | — |
| % Solids | — | — | 11 | 8 |
| Temperature (° C.) | 80 | 80 | 80 | 80 |
| Spray Coater Height (mm) | 120 | 120 | 120 | 120 |
| Deposition Flow Rate (mL/min) | 1.5 | 1.5 | 1.5 | 1.5 |
| Spray Coater Travel Speed (mm/s) | 120 | 120 | 120 | 120 |
| Dwell Time (s) | 30 | 30 | 30 | 30 |
| Number of Passes | 20 | 20 | 20 | 10 |

Figure 2:
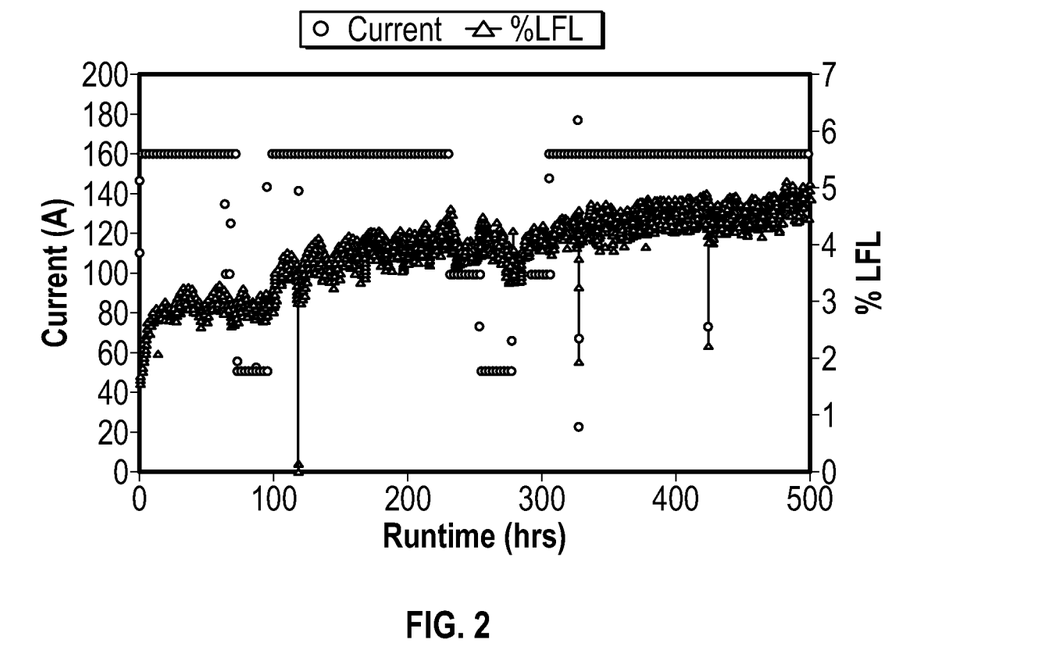
FIG. 2 is a graph of current and lower flammability limit versus runtime for a membrane electrode assembly manufactured according to an embodiment of the present disclosure.
Figure 3:
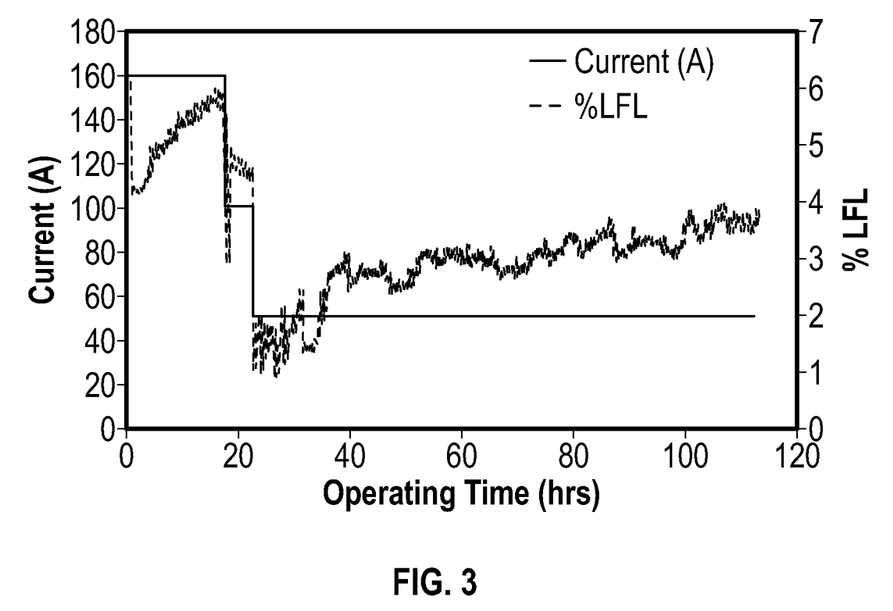
FIG. 3 is a graph of current and lower flammability limit versus runtime for a membrane electrode assembly manufactured according to an embodiment of the present disclosure.

FIG. 2 illustrates current and LFL versus run time with respect to the recombination layer. The LFL measurement represents the percentage of a combustible gas, such as hydrogen, propane, natural gas, in a given volume of air (e.g. the LFL for hydrogen in air is 4% by volume). As demonstrated in FIG. 2, successful hydrogen crossover mitigation exceeded 500 hrs.

In Example 1, the membrane electrode assembly was cycled between a current of 160 amps, 100 amps, and 50 amps to demonstrate effectivity of the recombination layer as oxygen dilution rates are decreased. The effectivity of the recombination layer is shown through the stability of the lower flammability limit (LFL) measurement collected in the oxygen stream as hydrogen gas back diffuses through the membrane. At 160 A, a certain amount of oxygen is generated, in which the percentage of hydrogen is measured in this stream to determine the amount of back diffusion through the membrane. The stack is then operated at currents below this value (50 A and 100 A), at which the amount of oxygen being generated is reduced, and presumably a larger percentage of hydrogen in oxygen. These current drops demonstrate that the LFL percentage does not increase with decreasing oxygen generation, indicating an effective recombination layer. Percentage LFL is the measure of the percent of the 4% hydrogen in oxygen limit.

Example 2

In Example 2, a membrane electrode assembly was manufactured including a recombination layer deposited onto a SOLVAY™ membrane, an ionomer layer deposited on the recombination layer, an anode catalyst layer applied to the ionomer layer, and a cathode catalyst layer applied to the surface of the SOLVAY™ membrane opposite that of the recombination layer.

The recombination suspension is a platinum diamino dinitrate solution that contains 6 mg Pt/mL. The ionomer suspension is a 5 weight percent solids Solvay ionomer dispersion diluted to 2.5 wt % using 1-propanol.

TABLE 3

| Parameter | Recombination Layer | Ionomer Layer | Anode Catalyst Ink | Cathode Catalyst Ink |
| --- | --- | --- | --- | --- |
| Density (mg/mL) | 6 | 2.5 | — | — |
| % Solids | — | — | 11 | 5 |
| Temperature (° C.) | 80 | 80 | 80 | 80 |
| Spray Coater Height (mm) | 120 | 120 | 120 | 120 |
| Deposition Flow Rate (mL/min) | 1.5 | 1.5 | 1.5 | 1.5 |
| Spray Coater Travel Speed (mm/s) | 120 | 120 | 120 | 120 |
| Dwell Time (s) | 10 | 10 | 10 | 10 |
| Number of Passes | 20 | 20 | 20 | 20 |

In Example 2, a membrane electrode assembly was developed in the same manner as in Example 1 using a SOLVAY membrane. This MEA was cycled between a current of 160 amps, 100 amps, and 50 amps to demonstrate effectivity of the recombination layer as oxygen dilution rates are decreased. The effectivity of the recombination layer is shown through the stability of the lower flammability limit (LFL) measurement collected in the oxygen stream as hydrogen gas back diffuses through the membrane. At 160 A, a certain amount of oxygen is generated, in which the percentage of hydrogen is measured in this stream to determine the amount of back diffusion through the membrane. The stack is then operated at currents below this value (50 A and 100 A), at which the amount of oxygen being generated is reduced, and presumably a larger percentage of hydrogen in oxygen. These current drops show that the LFL percentage does not increase with decreasing oxygen generation, indicating an effective recombination layer. This test demonstrates that the process is robust and can be used across various membranes.

Example 3

In Example 3, a membrane electrode assembly was manufactured including a recombination layer deposited onto a NAFION™ membrane, an ionomer layer deposited on the recombination layer, an anode catalyst layer applied to the ionomer layer, and a cathode catalyst layer applied to the surface of the NAFION™ membrane opposite that of the recombination layer.

The recombination suspension is a platinum diamino dinitrate solution that contains 6 mg Pt/mL. The ionomer suspension is a five weight percent Nafion dispersion diluted to 2.5 wt % using IPA.

The membrane electrode assembly was manufactured according to the process parameters listed in Table 4.

TABLE 4

| Parameter | Recombination Layer | Ionomer Layer | Anode Catalyst Ink | Cathode Catalyst Ink |
|---|---|---|---|---|
| Density (mg/mL) | 6 | 5 | | |
| % Solids | — | — | 11 | 8 |
| Temperature (° C.) | 80 | 80 | 80 | 80 |
| Spray Coater Height (mm) | 120 | 120 | 120 | 120 |
| Deposition Flow Rate (mL/min) | 1.5 | 1.5 | 1.5 | 1.5 |
| Spray Coater Travel Speed (mm/s) | 120 | 120 | 120 | 120 |
| Dwell Time (s) | 10 | 10 | 10 | 10 |
| Number of Passes | 20 | 20 | 20 | 10 |

Figure 4:
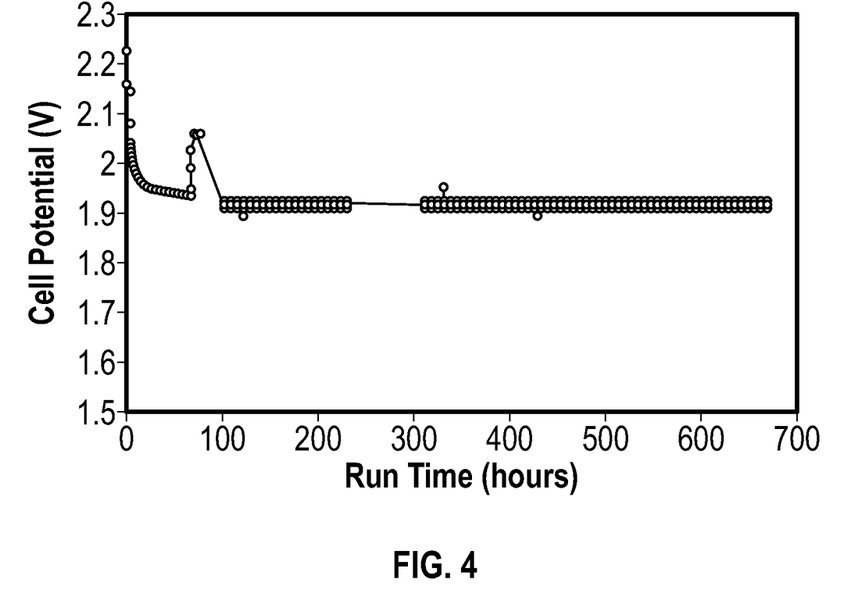
FIG. 4 is a graph of cell potential versus runtime for a membrane electrode assembly manufactured according to an embodiment of the present disclosure.

As shown in FIG. 4, Example 3 is used to exemplify the cell potential that is achieved through the dry deposition of the anode and cathode electrodes. The application of this deposition technique shows that there is no instability in cell performance resulting from the process. As demonstrated in FIG. 4, the voltage stability of the membrane electrode assembly is approaching 700 hours.

Example 4

Figure 5:
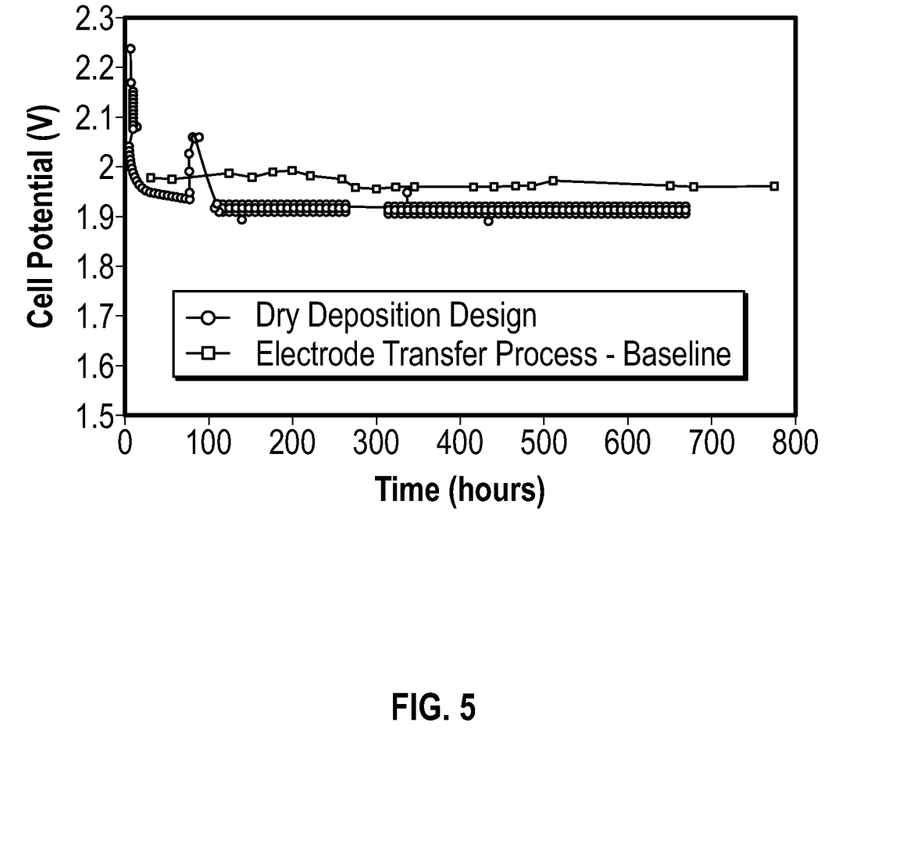
FIG. 5 is a graph of cell potential versus runtime for a membrane electrode assembly manufactured according to an embodiment of the present disclosure compared to a membrane electrode assembly manufactured according to a conventional wet process.

In Example 4, a membrane electrode assembly was prepared according to the methods and materials used in Example 1. FIG. 5 illustrates the comparison of cell potential between a membrane electrode assembly prepared according to Example 1 and a membrane electrode assembly prepared by an electrode transfer process. The membrane electrode assembly prepared by an electrode wet transfer process included a NAFION membrane, a recombination layer, and electrodes that included metal oxide on the anode and a pure metal on the cathode. The wet transfer process included hot pressing the electrodes directly to the membrane surface using a polytetrafluoroethylene binder. FIG. 5 illustrates that the present process does not have a negative impact on performance, as the voltages are within 50 mV of each other.

The present dry deposition methods eliminate manufacturing steps and reduce catalyst metal content loading, as compared to the conventional wet transfer process, thereby saving cost and time. In addition, the present methods allow for the deposition of all the layers within a single device.

The term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

We claim:

1. A method for manufacturing a membrane electrode assembly, the method comprising:
   depositing a recombination suspension directly onto a surface of an ionically conductive membrane forming a recombination layer, wherein the recombination suspension includes a solvent and metal oxide;
   reducing the metal oxide of the recombination layer to provide a cured recombination layer comprising the metal; and
   depositing an ionomer layer on a surface of the cured recombination layer.

2. The method of claim 1, further comprising depositing a first electrode catalyst layer on a surface of the ionomer layer, wherein the ionomer layer is positioned between the cured recombination layer and the first electrode catalyst layer.

3. The method of claim 2, further comprising depositing a second electrode catalyst layer on a surface of the ionically conductive membrane opposite of the cured recombination layer, wherein the ionically conductive membrane is positioned between the second electrode catalyst layer and the cured recombination layer.

4. The method of claim 1, wherein depositing the recombination suspension includes spraying the recombination suspension onto the surface of the ionically conductive membrane, wherein the recombination suspension is substantially free of solvent when the suspension contacts the surface of the ionically conductive membrane.

5. The method of claim 1, wherein depositing the recombination suspension includes spraying the recombination suspension onto the surface of the ionically conductive membrane, wherein the deposition flow rate is 1.0 to 2.0 mL/min, wherein the density of the recombination suspension is 4 to 8 mg/mL.

6. The method of claim 1, wherein the recombination suspension includes platinum oxide.

7. The method of claim 1, wherein depositing the ionomer layer includes spraying a ionomer layer solution onto the surface of the cured recombination layer, wherein the deposition flow rate is 1.0 to 2.0 mL/min, wherein the percent solids of the ionomer layer solution is 2.5 to 5%.

8. The method of claim 2, wherein depositing the first electrode catalyst layer includes spraying a first electrode catalyst solution onto the surface of the ionomer layer, wherein the deposition flow rate is 1.0 to 2.0 mL/min, wherein the percent solids of the first electrode catalyst solution is 4 to 11%.

9. The method of claim 3, wherein depositing the second electrode catalyst layer includes spraying a second electrode catalyst solution onto the surface of the ionically conductive membrane, wherein the deposition flow rate is 1.0 to 2.0 mL/min, wherein the percent solids of the second electrode catalyst solution is 4 to 8%.

10. The method of claim 3, wherein the first electrode catalyst layer forms an anode and the second electrode catalyst layer forms a cathode.

11. The method of claim 1, wherein the ionomer layer comprises perfluorosulfonic acid (PFSA), perfluorocyclobutane (PFCB), polyvinylidene fluoride (PVDF), polyether ether ketone (PEEK), polystyrene sulfonic acid (PSSA), poly(trifluorostyrene) sulfonic acid, polyvinylphosphoric acid (PVPA), polyacrylic acid (PAA), polyvinyl sulfonic acid (PVSA), sulfonated polyphenylene oxide (PPO), polybenzimidazle (PBI), brominated polyfluorene ether sulfone (BrPFES), polysulfone trimethylamine (PSF/TMA), or a combination thereof.

12. The method of claim 1, wherein the cured recombination layer includes platinum.

13. The method of claim 2, wherein the ionomer layer provides an electrical barrier between the recombination layer and the first electrode catalyst layer.

14. The method of claim 3, wherein the first electrode catalyst layer forms a cathode and the second electrode catalyst layer forms an anode.

15. The method of claim 1, wherein the metal comprises at least one or platinum, ruthenium, iridium, palladium, or rhodium.

* * * * *